Figure 1:
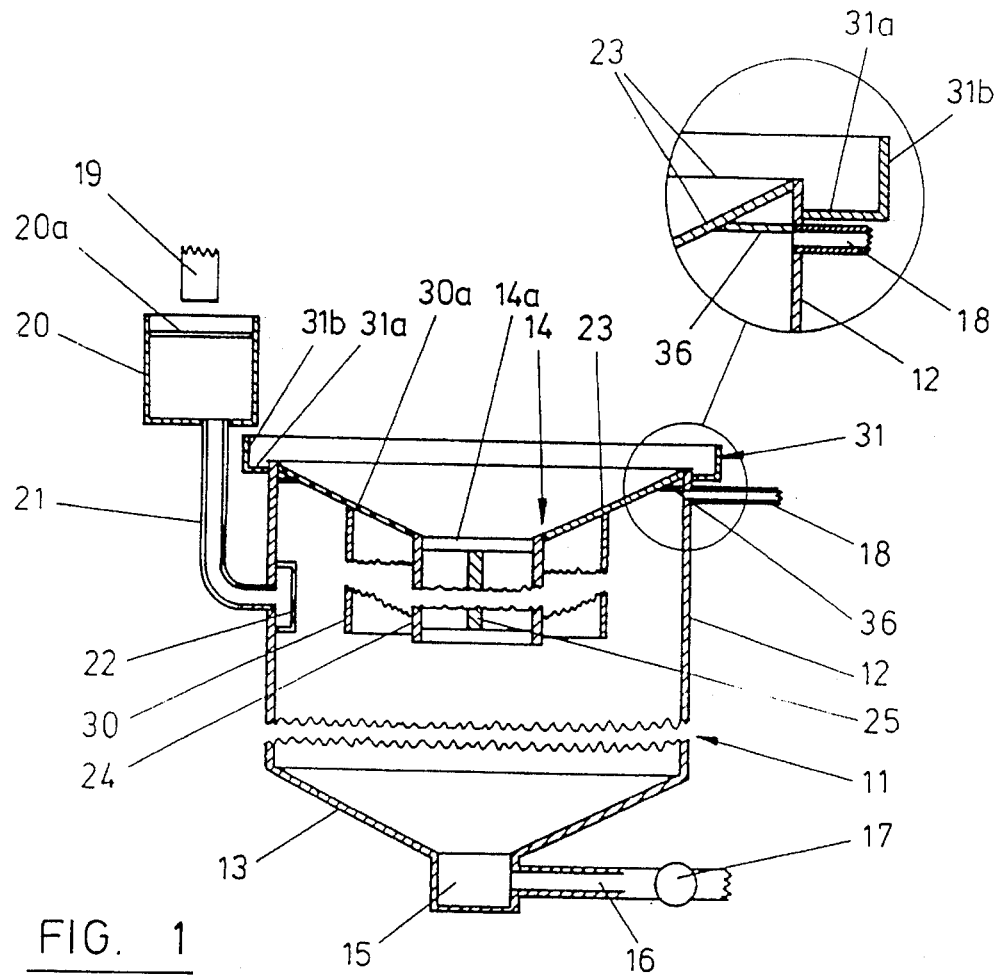

United States Patent [19]
Timmons

[11] Patent Number: 5,518,617
[45] Date of Patent: May 21, 1996

[54] GRAVITY CLARIFIER

[75] Inventor: Alban Timmons, Hull, Great Britain

[73] Assignee: The Clean Water Company Limited, United Kingdom

[21] Appl. No.: 211,828
[22] PCT Filed: Oct. 16, 1992
[86] PCT No.: PCT/GB92/01904
§ 371 Date: Apr. 18, 1994
§ 102(e) Date: Apr. 18, 1994
[87] PCT Pub. No.: WO93/07948
PCT Pub. Date: Apr. 29, 1993

[30] Foreign Application Priority Data

Oct. 19, 1991 [GB] United Kingdom ............... 9122222

[51] Int. Cl.[6] .................................................. B01D 43/00
[52] U.S. Cl. .................. 210/519; 210/521; 210/532.1; 210/533; 210/534; 210/538; 210/539; 210/540
[58] Field of Search .................. 210/513, 519, 210/521, 523, 532.1, 532.2, 533, 534, 538, 540, 539

[56] References Cited

U.S. PATENT DOCUMENTS 2,307,154  1/1943  Osuna .................................. 210/540
3,965,013  6/1976  Jackson .............................. 210/519

FOREIGN PATENT DOCUMENTS 220512  6/1987  United Kingdom .

OTHER PUBLICATIONS

VDI Zeitschrift, vol. 104, No. 4, 1 Feb. 1962, VDI Verlag GmbH (Dusseldorf, DE), E. Wolfel, p. 174.

Primary Examiner—Robert A. Dawson
Assistant Examiner—David A. Reifsnyder
Attorney, Agent, or Firm—William A. Drucker

[57] ABSTRACT

A separator for separating contaminants from a base liquid. The separator includes a roof arrangement, part of which extends downwardly and radially inwardly into the liquid in the separator. The roof arrangement is generally in inverted conical form. The decontaminated liquid flows from the separator through a flow modifying member which dampens any circulating flows in the liquid, and flows upwardly out of the separator to a reservoir defined by the inverted conical roof arrangement. The arrangement also includes structure for releasing gases from the volumes beneath the roof arrangement, thereby maintaining the whole of the roof arrangement in contact with the liquid to assist in reducing circulating flow in the liquid on the upper regions of the separator vessel.

16 Claims, 1 Drawing Sheet

GRAVITY CLARIFIER

This invention relates to separators and, more particularly, to separators for removing contaminates from base liquids.

In this specification the term "base liquid" is intended to mean the liquid to be cleaned of contaminates, the term "light contaminates" is intended to mean a any solid, semi-solid, semi-liquid or liquid, having a specific gravity less than that of the base liquid and the term "heavy contaminates" is intended to mean any solid, semi-solid, semi-liquid or liquid, having a specific gravity greater than that of the base liquid.

Separators for separating contaminates from base liquids are well known in the art and generally comprise a cylindrical vessel, arranged with its axis substantially vertical, closed at the top by a flat roof and closed at its lower regions by a conical bottom, arranged such that its central regions are lower than the edge regions thereof. The vessel includes an inlet for the contaminated base liquid, an outlet for the heavy contaminates in the lower regions of the vessel, and/or an outlet for the light contaminates in the upper regions of the vessel, and an outlet in the upper regions for the decontaminated base liquid.

The separation of the heavy and/or light contaminates from the base liquid is effected by inducing circulating flows in the vessel, generally by introducing the contaminated base liquid tangentially into the vessel, whereby the circulating flows generate laminar flows within the base liquid, which assist the rise of light contaminates and/or the fall of the heavy contaminates through the base liquid under gravity.

As stated, separators of the type described above are well known in the art and are described in detail in, for example, British Patent Publications No. 2205512 and No. 2158741.

In all the separators of the type described above the tangential entry of the contaminated base liquid into the charged vessel causes the base liquid entering the vessel to flow adjacent the cylindrical wall of the vessel, the "drag" effected by the cylindrical side wall induces laminar flows in the circulating liquid and the heavier contaminates fall readily to the lower regions of the vessel whilst the lighter contaminates rise readily through the base liquid. In the lower regions of the vessel the frictional forces acting between the bottom of the cylinder and the circulating liquids induces laminar flows in the base liquid which assists in slowing down the circulating flows and, in said lower regions the flows are substantially slower than at the liquid inlet so that the heavy contaminates cannot rise within the liquid and, because of the conical bottom of the vessel, the heavy contaminates are carried to the heavy contaminates outlet.

Because of the laminar flows the rate of displacement of the circulating liquid reduces towards the central regions of the vessel and, with the continuous entry of contaminated liquid into the vessel, the decontaminated liquid in the upper central regions of the vessel are displaced upwardly towards and through the decontaminated liquid outlet.

It is important that in the upper regions of the vessel the circulating flows in the liquid be effectively damped, to allow any heavy contaminates carried over by the flows in the liquid to fall down through the relatively quiescent liquid in the upper regions of the vessel, and whilst so-called "flow-modification" elements may be positioned in the upper regions of the vessel to assist in reducing circulating flows, the friction between the roof and the liquid in the vessel plays a great part in achieving the desired damping.

Unfortunately, the known separators of the type described above and which inevitably include a flat roof suffer from irregular efficiency, which can cause contaminates to carry over to the decontaminated liquid outlet.

Further, when the decontaminated liquid outlet comprises an upwardly rising outlet pipe, the inlet pressure required to force the decontaminated liquid through the outlet pipe can often require the inlet liquid to be pumped, which can adversely affect the desired flows in the separator and adds significantly to the processing costs.

The present invention seeks to provide a separator of the type defined above and which afford greater efficiency and stability of performance than prior art separators.

According to the present invention there is provided a separator comprising a generally cylindrical wall section, a bottom arrangement closing the lower regions of said cylindrical wall section and a roof arrangement closing the upper regions of said cylindrical wall section, an inlet for base liquid, an outlet for decontaminated base liquid passing through said roof arrangement and an outlet for contaminates, and wherein at least a region of said roof arrangement extends downwardly and radially inwardly into the said separator such as to be below the plane of the peripheral edge regions of said roof arrangement and a flow modifying member depends from said roof arrangement into the separator, said flow modifying member being in the form of a cylindrical wall surrounding and radially spaced from the decontaminated liquid outlet.

Preferably the said roof arrangement comprises a radially inwardly and downwardly extending wall member.

Preferably said wall member defines an inverted conical form for said roof arrangement.

Preferably the said decontaminated liquid outlet comprises an axial aperture through said roof arrangement.

In one embodiment said outlet for contaminates comprises an outlet for heavy contaminates and said outlet is located in the lower regions of the separator and comprises a sump with an outlet duct extending therefrom.

In another embodiment said outlet for contaminates comprises an outlet for light contaminates and said outlet is located in the uppermost regions of the separator.

In a further embodiment the separator includes an outlet for heavy contaminates and an outlet for light contaminates.

Preferably the roof arrangement includes a cylindrical wall, surrounding the said decontaminated base liquid outlet and depending into the separator.

In a preferred embodiment said cylindrical wall houses a flow modifying element arranged to prevent circulating flows within said cylindrical wall.

In one arrangement the decontaminated liquid flowing through the decontaminated liquid outlet forms a reservoir in the depression defined by the external surface of the roof arrangement and said reservoir exhausts to a decontaminated liquid discharge duct.

In a preferred embodiment every volume open to the roof arrangement includes means for bleeding gases from said volume.

Figure 2:
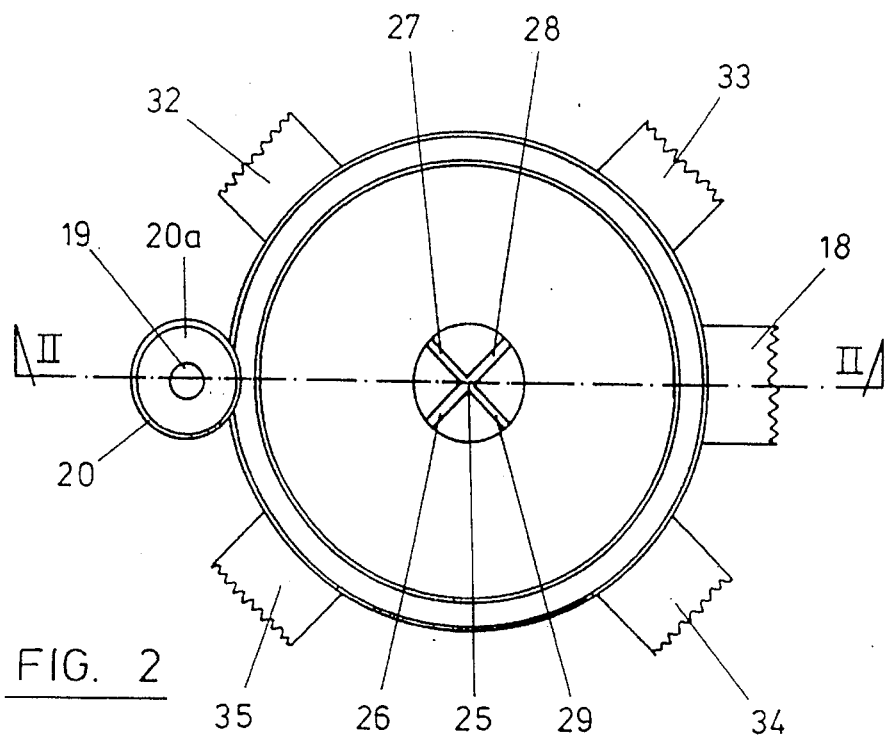

The invention will now be described further by way of example with reference to the accompanying drawings in which, FIG. 1 shows a vertical cross-section through a separator in accordance with the invention on the line II—II in FIG. 1, and FIG. 2 shows a plan view of the separator illustrated in FIG. 1.

In the illustrated example a cylindrical separator vessel 11 is arranged with its central axis substantially vertical and said vessel 11 generally comprises a cylindrical wall 12, which is closed at its bottom region by a downwardly and inwardly extending wall 13 forming an inverted conical bottom for the vessel 11, and is closed at its top regions by a roof, generally indicated by reference 14.

The bottom 13 includes a sump 15, concentric with the axis of the vessel 11, with a take-off pipe 16 opening into the sump 15, and the conduit 16 is closeable by a valve 17. The sump 15 and pipe 16 define the heavy contaminates outlet from the vessel 11.

The top 14 has an aperture 14a therethrough, defining the decontaminated liquid outlet from the vessel 11, and a duct 18 opens into the upper regions within the vessel and defines the light contaminates outlet from the vessel.

The vessel 11 is supplied with contaminated base liquid via a duct 19 which discharges freely to a tank 20, the tank 20 has a filter 20a extending across its upper regions but spaced from the upper peripheral edge of the tank 20, and the tank 20 discharges via a conduit 21 and through a tangential discharge element 22, within the vessel 11.

The method for releasing contaminated base liquid tangentially into the vessel 11 is well known in the art and no further description is necessary herein, it simply being noted that the tangential discharge of a contaminated liquid into the vessel 11 produces circulating flows within the vessel 11, substantially concentric with the axis of the vessel 11, and the level of the contaminated base liquid in the tank 20 defines the hydraulic head driving the contaminated liquid through the separator vessel 11.

Further, the method for operating the separator described above is substantially similar to the method for operating prior art separators and wherein, when the vessel 11 is charged with base liquid and additional base liquid is flowing into the vessel 11 via the conduit 21 and tangential discharge element 22, the contaminated base liquid entering the vessel 11 generates circulating flows within the vessel 11, substantially concentric with the axis thereof.

The frictional forces between the circulating flows and the internal surfaces of the vessel 11 produce laminar flows within said circulating liquid and said circulating, laminar flows facilitate the displacement of the heavy and light contaminates, under gravity, through the liquid.

The said heavy contaminates are carried by the circulating flows adjacent the bottom 13 to the sump 15 and, when the liquid contains a high proportion of heavy contaminates, the valve 17 may be continuously open to allow the heavy contaminates to drain continuously from the sump 15 via the conduit 16. In other arrangements the valve 17 may be periodically closed, to allow heavy contaminates to accumulate in the sump 15, for periodic draw-off.

The circulating, laminar flows also facilitate the displacement of the light contaminates upwardly through the base liquid and such light contaminates can be continuously, or periodically, removed from the vessel 11, via the conduit 18.

With the friction between said circulating flows and the internal surfaces of the vessel 11, and the laminar flows, the circulating flows reduce in velocity towards the central axis of the vessel 11 and, because of the hydraulic head generated by the level of liquid in the tank 20, the liquid rises within the central regions of the vessel 11, generally spiralling upwardly, and the decontaminated liquid flows rising within the vessel 11 discharge through the decontaminated liquid outlet, defined by aperture 14a.

As stated hereinbefore, the mode of operation of the separator described above is well known in the art.

The separator according to the present invention differs from all prior art separators in the construction of the upper regions of the vessel 11, and in particular the roof 14, and the modified flow patterns in the liquid generated by the construction of said upper regions.

Thus, in the illustrated embodiment, the said roof 14 generally comprises a downwardly and inwardly extending wall 23, defining an inverted conical roof 14 for the vessel 11, and the aperture 14a passes axially through said wall 23. Thus, the inverted conical roof forms a reservoir for the decontaminated liquid rising up through apertures 14a.

A cylindrical wall 24 depends downwardly into the vessel 11 from the periphery of the aperture 14a, concentric with the axis of the vessel 11, and the cylindrical wall 24 includes a spider 25 comprising four plates, 26, 27, 28 and 29, equally spaced apart circumferentially about the axis of the cylindrical wall 24, with their major faces substantially parallel to the axis of the vessel 11.

The wall 23 further supports a cylindrical flow modifying member 30, extending into the vessel 11, spaced from, and concentric with, the cylindrical wall 24. The flow modifying member 30 includes at least one opening 30a therethrough, the, or each of, said openings 30a is in the fore of a notch in its upper edge region of the member 30 and said opening(s) 30a serve to allow gases and light contaminates, rising within the annular volume between the wall 24 and the member 30, to escape radially outwardly from within the member 30.

In another embodiment each and every volume open to the roof wall 23 is arranged to vent gases therefrom through a volume arrangement individual to each said volume.

The upper regions of the cylindrical wall 12 are surrounded by a gutter 31 comprising a radial bottom wall 31a, secured to the cylindrical wall 12 at a location spaced below the upper edge region of the wall 12, and a cylindrical wall 31b upstanding from the bottom wall 31a. The wall 31b terminates on a plane upwardly of the plane of termination for the upper edge of the cylindrical wall 12.

The gutter 31 is drained by way of four ducts 32, 33, 34 and 35, equally spaced apart circumferentially abut the axis of vessel 11, and entering through the upstanding wall 31b of the gutter 31. In another arrangement the gutter 31 may be dispensed with and the reservoir may be drained by duct means.

An annular plate 36, lying in a plane at right angles to the axis of vessel 11, extends from the cylindrical wall 12 to the wall 23, the greater part of the wall 23 passes through the aperture in the annular plate 36, and said annular plate 36 defines a radially narrow flat surface comprising the upper regions of the liquid chamber within the vessel 11.

The duct 18 passes through the cylindrical wall 12 and has the upper regions of its bore 31a slightly above the under-surface of the plate 30, whereby to efficiently remove all gases and light contaminates from the upper regions of the vessel 11.

The upper regions arrangement for the vessel 11 described above afford a number of advantages over the flat or planar roof arrangements proposed by the prior art.

Firstly, with the flat roof, gases entrained with the incoming basic liquid, or released from solution within the vessel 11, can rise within the vessel and become trapped beneath the flat roof. Such gases accumulating under the roof reduce the area of contact between the liquid and the roof and thereby adversely reduce the braking effect exerted by the roof on the circulating flows in the liquid. This unpredicable loss of efficiency can cause carry-over of light and heavy contaminates through the decontaminated liquid outlet (aperture 14a).

With the roof arrangement according to the invention, gases rising through the liquid to any part of the roof are caused to flow up the internal surface of the conical wall 23 to exhaust through the light contaminates outlet (conduit 31). Thus a more uniform efficiency is obtained.

A further advantage of a non-flat roof is that the area of the roof in contact with the liquid in the upper regions is increased, to give more efficient braking of the circulating flows in the liquid.

Further, the flow modifying member 30 increases the surface area of the roof in contact with the liquid, again increasing the efficiency of the separator without trapping gases or light contaminates.

Further, the liquid entering the lower regions of the cylindrical wall 24 to pass to the decontaminated liquid outlet (aperture 14a) may still be circulating, if at a lower rate than at the regions adjacent the cylindrical wall 12, and in flowing upwardly within the cylindrical wall 24, the spider 25 effectively brakes the circulating flows to allow any heavy contaminates carried-over by the circulating liquid to fall under gravity downwardly through the liquid.

By the above arrangement for the upper regions of the separator a most consistent and efficient separation is obtained, substantially all the heavy and light contaminates in the base liquid are removed therefrom, and the liquid flowing upwardly through the aperture 14a and over the edge of the roof 14 into the gutter 31 is substantially decontaminated.

In the illustrated embodiment the light contaminates outlet duct 18 is shown as extending radially from the separator 11 and this arrangement is quite adequate for contaminated basic liquids having a relatively small amount of light contaminates. When the separator is to handle contaminated base liquids containing a substantial volume of light contaminates, the separator preferably includes more than one light outlet duct 18 and said ducts 18 are spaced apart circumferentially about the separator. In another embodiment the, or each, light contaminates outlet duct 18 may protrude into the liquid in the upper regions of the separator and lie tangential to the outer regions of said liquid.

Further, whilst the wall 24 with the element 25 therein is normally effective for preventing circulating flows in the liquid passing to the aperture 14, it is sometimes advantageous to provide a plurality of cylindrical walls, concentrically arranged within the cylindrical wall 11, with each cylindrical wall supported from the adjacent walls by radial elements presenting major faces substantially parallel to the axis of the cylindrical wall 24.

Whilst the uppermost regions of the liquid volume in the separator is, in the illustrated embodiment, defined by the annular plate member 36, the plate 36 may be replaced by a moulded plastics member and, when a plurality of decontaminated liquid outlets are provided, the member 36 may be omitted and the light contaminates duct(s) 18 may protrude into the gutter 31 without interrupting the discharges of decontaminated liquid to the gutter 31 and into the outlet ducts 32, 33, 34 and 35.

Whilst in the above described embodiment the roof 14 is illustrated as being defined by a conical wall 23 the invention is not restricted thereto and said roof may, for example, be of bowl-like configuration, or conical in steps, subject to the surface(s) of the roof presented to the liquid being arranged to direct gases and light contaminates radially outwardly with respect to the axis of the vessel 11.

I claim:
1. A separator comprising:
   (a) a generally cylindrical wall section having an axis, a lower region and an upper region,
   (b) a bottom arrangement closing the lower region of said cylindrical wall section,
   (c) a roof arrangement having a peripheral edge region closing the upper region of said cylindrical wall section,
   (d) an inlet for base liquid,
   (e) an outlet passing through said roof arrangement for removing decontaminated base liquid,
   (f) an outlet for contaminants,
   (g) at least a region of said roof arrangement extending toward said bottom arrangement and radially inwardly into the separator such as to be below the plan of the peripheral edge region of said roof arrangement, and
   (h) a flow modifying member depending from said roof arrangement into the separator, said flow modifying member being a cylindrical wall surrounding and radially spaced from the decontaminated liquid outlet.

2. A separator according to claim 1, wherein the said roof arrangement comprises a wall member extending toward said axis and toward said bottom arrangement.

3. A separator according to claim 2, wherein said wall member defines an inverted conical form for said roof arrangement.

4. A separator according to claim 3 wherein the said decontaminated liquid outlet comprises an aperture through said roof arrangement coaxial with said axis.

5. A separator according to claim 4 wherein said outlet for contaminates comprises an outlet for heavy contaminates and said outlet is located in the lower regions of the separator and comprises a sump with an outlet duct extending therefrom.

6. A separator according to claim 5 wherein the roof arrangement includes a cylindrical wall, surrounding the said decontaminated base liquid outlet and depending into the separator.

7. A separator according to claim 6 wherein the decontaminated liquid flowing through the decontaminated liquid outlet forms a reservoir in the depression defined by the external surface of the roof arrangement and said reservoir exhausts to a decontaminated liquid discharge duct.

8. A separator according to claim 7 wherein every volume open to the roof arrangement includes means for bleeding gases from said volume.

9. A separator according to claim 1 wherein the said decontaminated liquid outlet comprises an aperture through said roof arrangement coaxial with said axis.

10. A separator according to claim 1 wherein said outlet for contaminates comprises an outlet for heavy contaminates and said outlet is located in the lower region of the separator and comprises a sump with an outlet duct extending therefrom.

11. A separator according to claim 10 wherein the separator further includes an outlet for light contaminates.

12. A separator according to claim 10 wherein said outlet for contaminants further comprises an outlet for light contaminates and said outlet is located in the upper regions of the separator.

13. A separator according to claim 1 wherein said outlet for contaminants comprises an outlet for light contaminates and said outlet is located in the upper region of the separator.

14. A separator according to claim 13 wherein the separator further includes an outlet for heavy contaminates.

15. A separator according to claim 1 wherein the decontaminated liquid flowing through the decontaminated liquid outlet forms a reservoir in the depression defined by the external surface of the roof arrangement and said reservoir exhausts to a decontaminated liquid discharge duct.

16. A separator according to claim 1 wherein every volume open to the roof arrangement includes means for bleeding gases from said volume.

* * * * *